United States Patent
Latter

[11] Patent Number: 5,705,026
[45] Date of Patent: Jan. 6, 1998

[54] MODULAR SEALING MACHINE

[76] Inventor: Melvin R. Latter, c/o M. Latter Mfg., Inc. 3669 7th Ave., Los Angeles, Calif. 90018

[21] Appl. No.: 419,997

[22] Filed: Apr. 10, 1995

[51] Int. Cl.$^6$ ........................................... B32B 31/20
[52] U.S. Cl. .................. 156/583.9; 156/515; 156/583.2; 156/583.8; 493/189; 493/209
[58] Field of Search .......................... 156/251, 515, 156/530, 583.1, 583.8, 583.9, 583.91, 583.2; 443/189, 193, 194, 199, 203, 209

[56] References Cited

U.S. PATENT DOCUMENTS

| | | | |
|---|---|---|---|
| 3,047,993 | 8/1962 | Siegel et al. | 156/583.2 X |
| 3,490,981 | 1/1970 | Shanklin | 156/583.2 |
| 3,496,049 | 2/1970 | Anderson | 156/289 |
| 3,655,487 | 4/1972 | Farkas | 156/380 |
| 3,912,575 | 10/1975 | Zelnick | 156/515 |
| 4,010,063 | 3/1977 | Natter | 156/510 |
| 4,262,833 | 4/1981 | Zelnick | 156/583.2 |
| 4,333,297 | 6/1982 | Kuttenbaum et al. | 53/252 |
| 4,351,692 | 9/1982 | Ouellette | 156/443 |
| 4,447,284 | 5/1984 | Shanklin et al. | 156/366 |
| 4,589,948 | 5/1986 | Held | 156/555 |
| 4,643,296 | 2/1987 | Braun | 198/735 |
| 4,650,535 | 3/1987 | Bennett | 156/352 |
| 4,723,484 | 2/1988 | Held | 100/38 |
| 4,822,447 | 4/1989 | Obermeier | 156/538 |
| 4,829,751 | 5/1989 | Tisma | 53/575 |
| 4,939,889 | 7/1990 | Watanabe | 53/450 |
| 4,982,556 | 1/1991 | Tisma | 53/506 |
| 5,015,325 | 5/1991 | Bennett et al. | 156/513 |
| 5,070,681 | 12/1991 | Romagnoli | 53/566 |
| 5,157,896 | 10/1992 | Tisma | 53/252 |
| 5,177,931 | 1/1993 | Latter | 53/133.3 |
| 5,198,056 | 3/1993 | Stockli et al. | 156/73.1 |
| 5,253,748 | 10/1993 | Ledet | 198/834 |
| 5,324,385 | 6/1994 | Bennett | 156/583.1 |
| 5,350,348 | 9/1994 | Guot | 493/34 |
| 5,480,509 | 1/1996 | Matsuo et al. | 156/522 |

OTHER PUBLICATIONS

Branson Sonic Power Company, Branson Data Sheet PW–33, Apr. 1982.
Branson Sonic Power Company, Branson Data Sheet PW–20, 1975.
Branson Sonic Power Company, Branson Data Sheet PW–32, Feb. 1982.

*Primary Examiner*—James Sells
*Attorney, Agent, or Firm*—Ladas & Parry

[57] ABSTRACT

This invention is a modular sealing machine. It is comprised of a base unit to which parts may be modularly added to customize the machine.

24 Claims, 5 Drawing Sheets

FIG.5

MODULAR SEALING MACHINE

BACKGROUND OF THE INVENTION

Known in the art are sealing machines for sealing plastic wrap around products. These machines can be purchased in various models. Some are largely mechanically operated, with a sealing arm pivotally attached to the body and electrically hard-wired into the machine. The arm may be manually pivoted up and down with respect to the machine top surface. If the user of the machine wishes a more costly and complex machine, a further model may be ordered in which the arm is pneumatically and/or electro-magnetically controlled. In this case, the pneumatic and/or magnetic means are hard-wired and permanently bolted or welded into the machine body and integral therewith. Additionally, the machine may be ordered with any one of the foregoing features and with a permanently attached, integral, conveyor system which conveys articles which have been sealed by the sealing arm away from the machine. The machine may further be ordered with an automatic arm control. Again, this feature is a permanent installation in the machine. The machine may also be ordered with an automatic plastic feeder unit for feeding plastic through the machine. This unit is again a permanent and integral portion of the machine and is hard-wired into the electrical system of the unit.

Since the machines are relatively expensive, a small company usually first orders a manually operated machine. As the company grows, it may then invest in a second machine that is equipped with the magnetic or pneumatic means and perhaps as well with the conveyor. Finally, it may purchase as a third machine, an automatic machine. Each additional feature adds to the price of the machine and the machine cannot be readily changed to later delete or add parts. Accordingly the user cannot turn a manual machine into an automatic machine or vice versa.

The technology for providing the heating elements in the sealing arm with electric current so that the arm acts as a hot sealer frame, the technology for pneumatic and magnetic controls, and the technology for automated machines and feeder and conveyors, is well established in the art and of a reliable nature in quality machines. Thus, the well-constructed sealing machines of the prior art are usually durable and provide to the purchaser a machine with a long useful life requiring minimal reasonable upkeep. While this may be desirable if the model machine purchased is the model one wishes to use for the next 25 years, it is not so if one wishes an upgraded or downgraded machine over the years due to a change in business. For that party, different machines must be purchased over the life of the business to accommodate the needs of the business. The end result is a significant outlay in monies for a stock of machines which is comprised of only a portion that meets the needs of the company at a given point in time.

The present invention attempts to resolve this problem by offering to the purchaser a modular machine. With the present invention, a base frame or machine may be purchased. As investment monies become available, the originally-purchased base machine may be readily upgraded rather than having to purchase a second upgraded machine. By way of example and not limitation, the base machine of the invention may be augmented by the addition of pneumatic, electro-magnetic, and automatic arm and feed means as well as conveyors, stands, and any other parts available at the time. Further, with the present machine, if a portion of the machine fails, it may be readily detached and replaced with another portion, while the problematic portion is being repaired. The inventor is unaware of any prior art sealing machine in which the parts may be modularly attached and detached and which parts are functioning useful units separate from the machine.

SUMMARY OF THE INVENTION

Disclosed herein is a modular sealing machine.

More narrowly, disclosed herein is a modular sealing machine wherein at least any one of or all of the following may be readily added or detached from the base frame unit: electrical unit, stand, sealing arm with sealing wire, pneumatic means, magnetic means, conveyor means, automatic arm means, automatic feed means, plastic feeder.

Stated otherwise, the present invention is a sealing machine comprised of readily detachable parts, said parts being generally independently operable. The present invention is comprised of a plurality of separable units which are merely bolted to one another to form one integrally operable unit.

DRAWINGS

The present invention will be better understood with reference to the following drawings. These drawings are intended to be examples of possible embodiments of the invention and are not intended to act as a limitation of the invention. The drawings are not necessarily drawn to scale.

FIG. 6b is a modified sealing arm for use with the magnetic means of FIG. 6a.

DETAILED DESCRIPTION OF THE INVENTION

Figure 1:
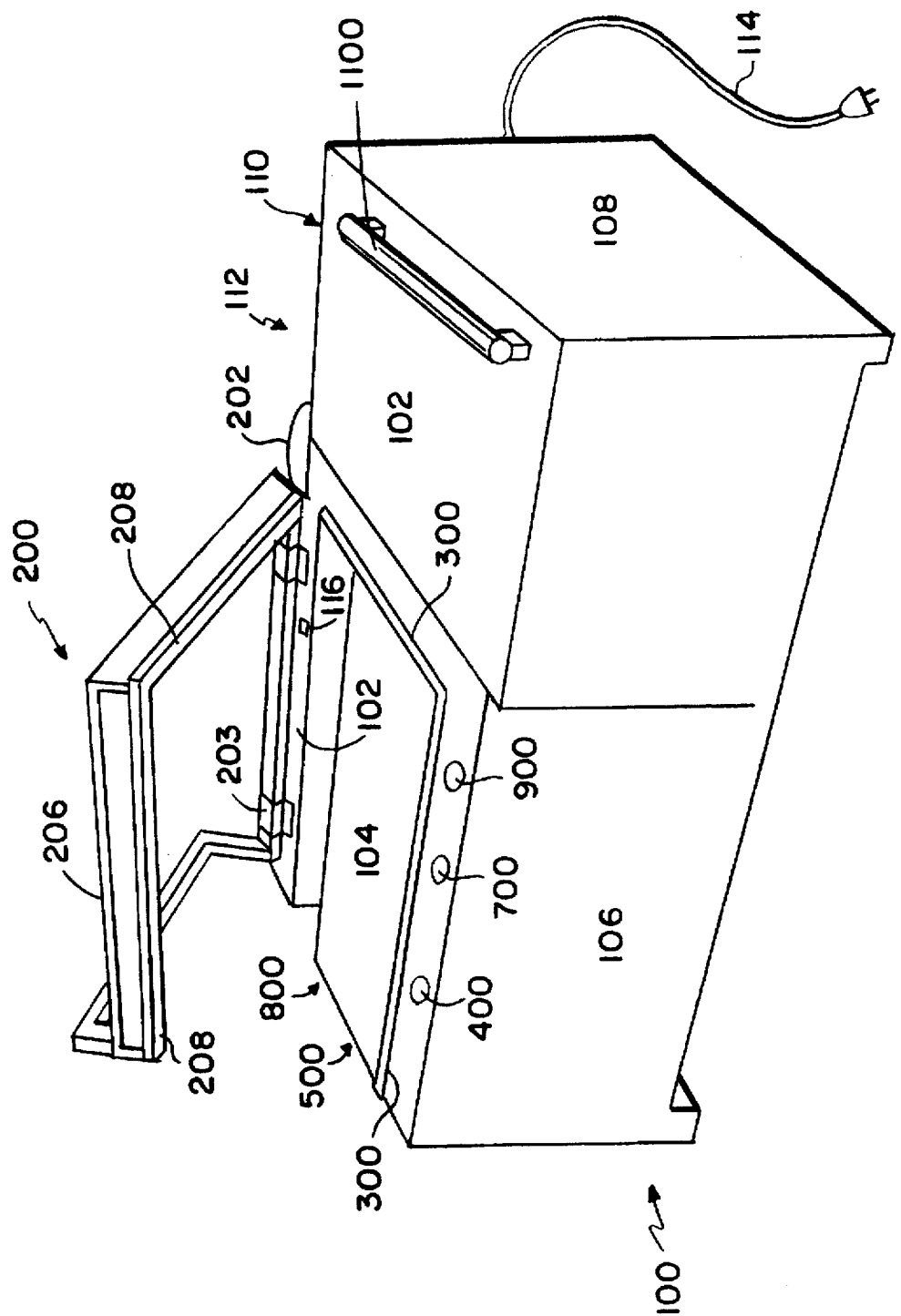
FIG. 1 is a perspective view of a prior art device.

FIG. 1 depicts a perspective, somewhat diagrammatic view of a prior art sealing machine (100) such as described in U.S. Pat. No. 4,650,535 or U.S. Pat. No. 5,324,385 both depicting inventions of Charles J. Bennett. In the present FIG. 1, the machine (100) has a top surface (102) which is planar on one end, and open on the other to expose a second work surface (104). Work surface (104) may represent the top of a permanently built-in conveyor (500), or merely a further surface which may be the top of a permanently built-in scissor jack. If the surface is a conveyor (500), then work surface (104) is mobile to carry work products away from top surface (102).

Connected at right angles to top surface (102) is front face (106). Extending at right angles from top surface (102) and front face (106), is a side end face (108). Not shown, but extending parallel to front face (106) and at right angles to top surface (102) and side end face (108), is a back face (110).

A hot sealing frame (200) is connected permanently at its back portion, to machine (100) by wire (202) and hinges (203). Hinges (203) attach to top surface (102) in the area of work surface (104) so that frame (200) may be moved with respect to top surface (102). A pad or pads (300) extend partially around work surface (104) and connect to top surface (102). These pads (300), interact with an electrical wire (208) which passes along a portion of hot sealer frame (200) and connects to wire (202). Handle (206), which is part of frame (200) and extends therefrom, is generally heat isolated from wire (208) and enables the user of the machine (100) to bring hot sealing frame (200) toward and away from pad (300). A switch (116), extends through top surface (102) to abut hot sealing frame (200) when the frame (200) is in a certain position. When switch (116) is in one position, as when frame (200) depresses it, electricity passes into wire (208), and when switch (116) is in another position, as when the frame (200) no longer contacts it, electricity is blocked from passing through wire (208). Wires (208) and (202) interconnect with switch (116). By bringing frame (200) against pads (300), switch (116) is depressed and electricity passes from wire (202) into wire (208) enabling the frame (200) to apply heat against pad (300). In this regard, roller (1100) mounted on the top of top surface (102) away from work surface (104), holds a plastic film comprised of two layers. This film is brought across pad (300) and work surface (104). An item to be sealed in the plastic is placed between the two layers on work surface (104), and then hot sealing frame (200) is brought down against the plastic and pads (300) to seal the item in the plastic. Heat emanating from wire (208) causes the plastic layers to laminate and ultimately, with enough heat, sever along the line defined by wire (208). Pads (300) are removably attached to top surface (102) for replacement due to wear.

The FIG. 1 prior art drawing, shows in diagrammatic form, that machine (100) has been produced with pneumatic (400) and/or electric magnetic means (700) as well as automatic means (900) and conveyor (500). These means are all permanently installed so that once the machine is powered, all services become available and are operable. Accordingly, and as understood by those skilled in the art but not specifically shown, the pneumatic (400) and magnetic (700) means operate with hot sealing frame (200). The automatic means (900) also operate with hot sealing frame (200), as well as roller (1100) and conveyor (500). The pneumatic means (400) will automatically and in timed sequence, bring the heating arm (200) up from and down against pads (300) and facilitate the amount of pressure exerted by hot sealing frame (200) against pads (300). The magnetic means (700) further acts to lock heating arm (200) against pads (300) for a selected time and to facilitate the amount of pressure with which the hot sealing frame (200) is held against the pads (300). In coordination with the lifting of hot sealing frame (200) away from pads (300), the conveyor (500) will be operated to carry goods sealed in plastic on work surface (104) off of that surface. Then more plastic will be fed onto pads (300) and work surface (104) for placement of an item therein and sealing of the plastic film thereabout.

Within the machine (100), are electrical connections, motors and the like to enable a conveyor (500), pneumatic (400) and/or magnetic (700) devices, the hot sealing frame (200) and any other devices to operate. These devices are ultimately provided power by their connection to cord (114) which extends from machine (100) and may be plugged into an electrical outlet. These devices are all permanent and integral connections of machine (100). One may not easily separate the pneumatic means (400), magnetic means (700), hot sealing frame (200) or any of the other parts from machine (100), with the exception of pads (300) which are readily removable. All other parts are permanently affixed to machine (100).

Figure 2:
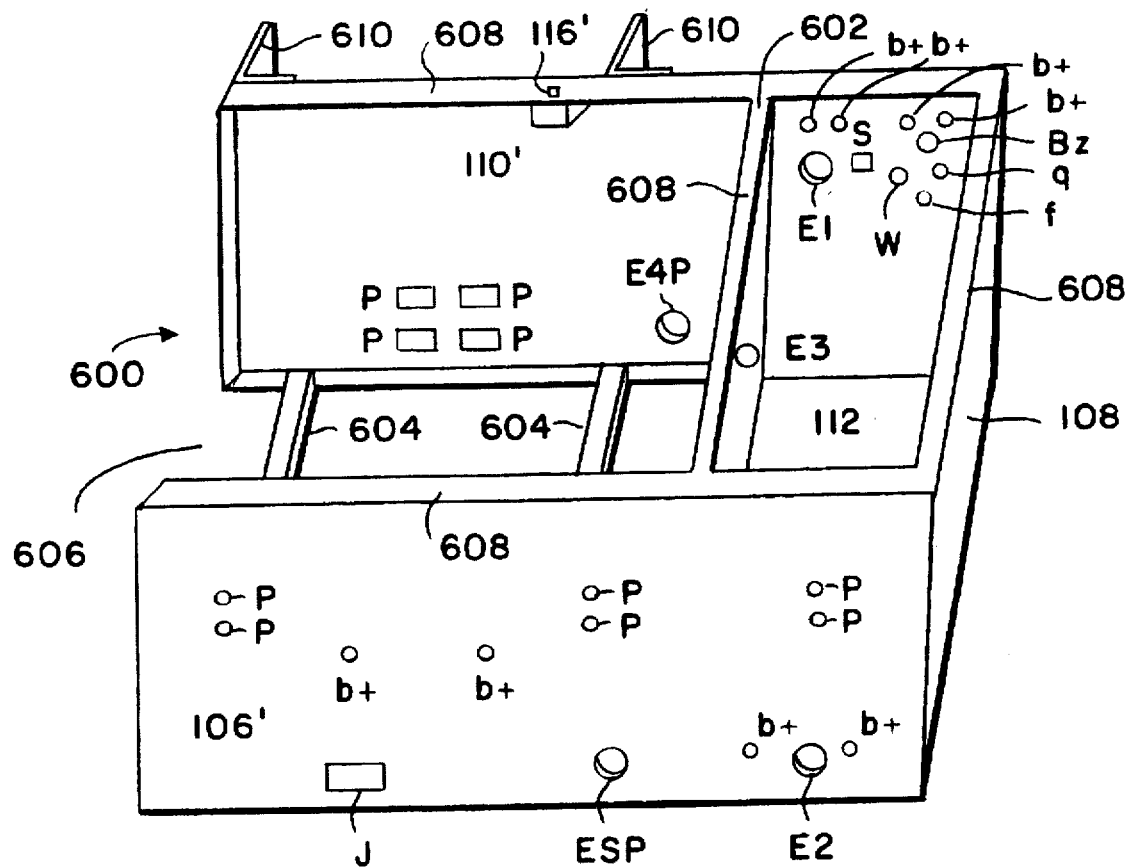
FIG. 2 is a perspective view of the base unit of the invention.

The following figures disclose one embodiment of a method of making all of the above features as well as others, modular. The inventor has made all of the units separately functional devices. However, these devices may be detachably connected to a base unit to work as an integrated unit. Such detachable connections may merely require the use of bolts and washers for mounting the means and a simple electrical connection for powering the means. Thus, the party who can only afford a manual machine in the beginning, may readily upgrade that machine as finances permit. And should, at some point, a less sophisticated machine be desired, the machine may again be reduced to a more basic unit. Turning then to FIG. 2 with reference to the other figures, the base unit (600) of this invention is shown. To the extent that base unit (600) shares features from the prior art drawing of FIG. 1, like reference numerals are used distinguished only by a "prime" notation.

Figure 4:
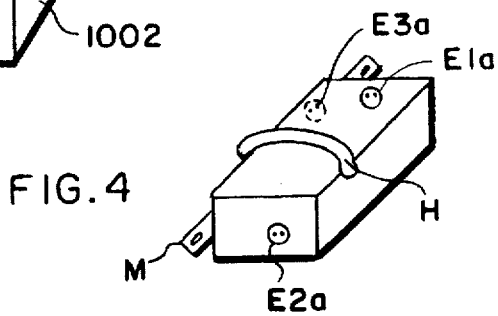
FIG. 4 is a perspective view of an electrical component box which may be placed in the electrical compartment of the base unit of FIG. 2.

In FIG. 2, a front face (106') connects at right angles to a side end face (108') which connects at right angles to a back face (110'). A divider wall (602) extends between front face (106') and back face (110') and is situated parallel to and spaced from side end face (108'). With this construction, divider wall (602) and side end face (108') define therebetween a compartment (112). This compartment (112), is to house the electronics of the invention. These electronics may be held in a container that is merely detachably mounted in compartment (112) or hard wired directly into compartment (112). FIG. 4, shows a container of electronics which may be placed in compartment (112).

The top of base unit (600) is defined by lips or edges (608) which are defined on the front face (106'), side end face (108') and back face (110') as well as by the top edge of divider wall (602). To these edges or lips (608), top surface (102'), a piece of sheet metal sized to fit over compartment, (112), may be bolted, hingedly connected, or otherwise removably attached. Pads (300) may then be detachably mounted to edges (608) and/or a portion of top surface (102') in an arrangement to interact with a hot sealing frame (200') as occurs in the prior art.

Extending between the lower portions of the front face (106') and the back face (110'), are two spaced-apart support bars (604). As is appreciated from FIG. 2, there is only one end connection between front face (106') and back face (110'). That is side end face (108'). The opposing end (606), has no end face causing base unit (600) to be open ended at end (606). It is between this open end (606) and divider wall (602) that support bars (604) are placed. Divider wall (602) broadly defines on one side the area for work surface (104'). On its opposing side, it defines the area for compartment (112') over which top surface (102') is detachably, hingedly or slidably situated.

Extending from the back face (110') of base unit (600), at open end (606) and near divider wall (602), are mounts (610). Mounts (610) are for adjustable and releasable connection to a hot sealing frame (200'). In the drawings, mounts (610) are shown as L units welded to base unit (600).

Base unit (600) defines a plurality of openings in its surfaces to enable the easy bolting to it of parts. Some of these openings are shown in FIG. 2. It is understood that additional openings may be added or openings may be left out depending upon the ultimate goals of the manufacturer. In this latter regard, there could be bolt openings in lips or edges (608) for detachably bolting top surface (102') to base unit (600). Top surface (102') would then have corresponding openings so a bolt could be passed through the corresponding openings and be secured in place by nuts and washers if necessary. On the other hand, it may be preferred to connect top surface (102') to base unit (600) by hinges so that it may be readily lifted up and down to expose compartment (112). Then openings for hinge connections would need to be present.

Shown in back face (110'), in that portion which makes up one wall of compartment (112), are numerous openings. Opening f is to hold a fuse holder. Opening Bz and the surrounding openings bt are for mounting a buzzer unit known in the art. The openings bt are for holding bolts that would pass through a plate holding a buzzer unit that would be electrically connected into compartment (112). If the electrical components were contained in a modularly removable container such as shown in FIG. 4, these openings would be omitted and the fuse and buzzer held instead in that unit. The unit would be detachably mounted in compartment (112) as at wings M, by bolts passing through the wings M, and a wall of compartment (112), or could rest on additional support bars that would be added to the base of compartment (112).

There is also an opening g for a ground connection in back face (110') in compartment (112). Opening W is to accommodate wires or a connector for a power connection. Thus plug and cord (114) shown in FIG. 1, would pass through this opening to provide power for the connections held modularly or otherwise in compartment (112).

Opening S is for detachable connection to a hot hole puncher (not shown) which is mounted detachably on a hot sealing frame (200). This opening may merely contain a plug into which the hot hole puncher may be connected. Instead, a cold punch could be used as known in the art. Then the connection S while still being a plug, would connect into a timer mechanism or the cold punch may have its own sensor and timer mechanism and/or operate through switch (116'), as will, through the reading of later paragraphs herein, be better understood.

Opening E1 and closely adjacent bolt hole openings bt, are for the extension of wires or a plug for detachable connection to wire (202') as shown in FIG. 1. Wire (202') is associated with hot sealing frame (200') and wire (208') which passes through a portion of the frame (200'). The bolt holes bt, are to accommodate a plate which may have therein a strain relief for holding the electrical connection which detachably attaches to wire (202'). The idea again, however, is that hot sealing frame (200') may be readily detached electrically and physically, the former here occurring by unplugging or unwiring it from its connection through opening E1, for repair or replacement. The latter, the physical connection is discussed in the following paragraphs. Again, the electrical connection made available through opening E1 may be held in a modular electrical unit mounted in compartment (112) which has electrical outlets in positions corresponding with the openings in base unit (600). This is seen to some degree by reviewing the modular unit in FIG. 4 and connections E1a, E2a, and E3a which coordinate with openings E1, E2, and E3 respectively in base unit (600). A handle (H) enables the ready positioning of the unit in the compartment (112).

In divider wall (602), is opening E3. This opening E3 may again hold a plug, outlet or readily attachable electrical wires for connection into the electrical compartment (112). These will be used to connect to conveyor (500') discussed in more detail in the following paragraphs. In a similar vein, opening E2 in front face (106') in the vicinity of compartment (112), also accommodates a plug, outlet or readily attachable electrical wires for connection to the electro-magnetic means (700') discussed in more detail in later paragraphs. Again, these electrical attachments could instead be held in the modular unit of FIG. 4 which may be placed in compartment (112), the attachments being situated in positions corresponding to openings E2 and E3.

Switch (116') in this invention, is a momentary switch known in the art. It is detachably located through an opening in lip (608) of back face (110') in the area where work surface (104') will be placed. The wiring from switch (116') passes through an unseen opening in divider wall (602) for connection into the electrical means housed in compartment (112).

There is also an unshown opening in the area of compartment (112) for extension of an "off-on" switch to power the components held in compartment (112).

Accordingly, it is seen that defined in the area of compartment (112), are openings for connection means to enable the detachable electrical connection of various different components to base unit (600) and the electrical and power components which may be modularly or permanently held in compartment (112). With the exception of the motor and mechanisms related to the hot sealing frame (200) and perhaps a central timer, compartment (112) acts as central power connection to which numerous independent units may be connected. This shall become more apparent from the following paragraphs.

In that portion of back face (110') which does not make up a portion of compartment (112), there are additional openings or attachment means. These are associated with the pneumatic means (400) and the markings therefore include a P. They are marked as P and E4P. There are four openings P shown in rectangular form which openings P are for mounting a piston and reed switch. One piston which may be used is made by the Bimba Company. The top plunger of the piston may be detachably connected to the back of the hot sealing frame (200') as shown diagrammatically in FIG. 9. The electrical connection from the piston and the air tube connection, both again seen in FIG. 9, will pass from the piston through opening E4P into a front opening E5P defined in the front face (106'). Turning, to front face (106'), defined thereacross are also a plurality of openings marked P. These are for mounting the pneumatic means (400) control and monitoring panel as well seen in FIG. 5. These mounting points P in both the back face (110') and the front face (106') may again be bolt holes for the easy detachable mounting of the pneumatic means (400) which includes the piston.

The electrical connection and air connection pass from the piston through opening E4P and opening E5P and connect to the pneumatic means (400) mounted on the front face (106'). Pneumatic means (400) then has extending from it an electrical connection (402) and an air pressure hose (404) as well seen in FIG. 5. The electrical connection may be connected to an outside outlet or there may be yet another opening defined in base unit (600) in compartment (112) for detachable connection to electrical connection (402). The air hose will connect to outside air means such as a compressor.

Front face (106'), in the area which does not act as a portion of compartment (112), also defines additional bolt openings bt. These are for detachably mounting an electromagnetic device or magnetic means (700') as seen in FIG.

6a. The cord or wires (702) that extend from electro-magnetic device (700') will plug into or electrically attach to the compartment (112) through opening E2 as earlier discussed. This enables the electro-magnetic device (700') to connect through switch (116') for operation in conjunction therewith. Additional openings could be included to mount several electro-magnetic devices (700'). These would be interconnected with each other and then connected to a central powering means as in compartment (112), by one cord (702) which plugs into opening E2.

The last opening to discuss, is that in front face (106') marked as J, and in the area which will lie under the hot sealing frame (200') when attached to the base unit (600). This opening is for extension of a mechanical or electro-mechanical means for adjustment of the scissor jack (800'). If the means is mechanical, it may simply be a knob connected to the scissor jack (800') which may be turned to raise or lower the scissor jack (800'). If the means is electro-mechanical, it would be a device to power the raising and lowering of the scissor jack (800). In such an instance, the electrical connection for the scissor jack (800) would again either plug into an outside outlet or through an opening defined in compartment (112) for power.

In the foregoing discussion, many of the modular units which may be used with the base unit (600) herein have been briefly discussed. These units along with others will now be discussed in greater detail with reference to the remaining figures of the drawing.

Figure 3:
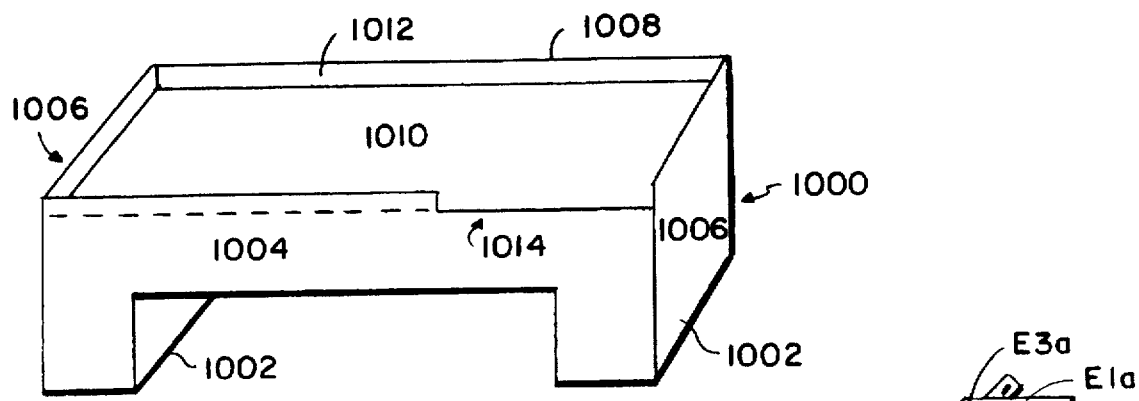
FIG. 3 is perspective view of a stand on which the base unit may be placed.
Figure 5:
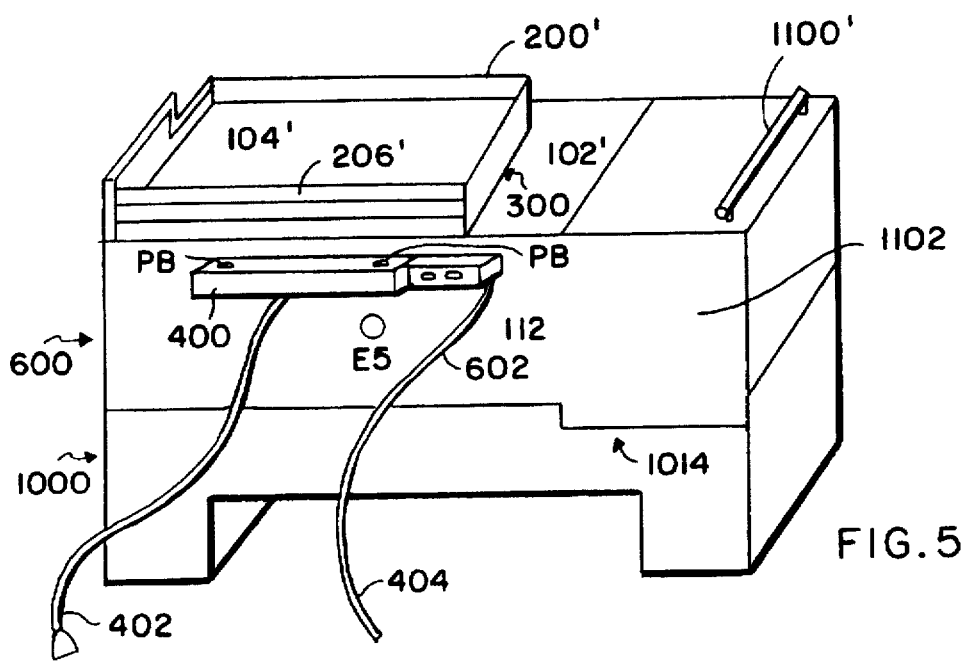
FIG. 5 is a front view of the base unit of FIG. 2 with the pneumatic means and sealing arm attached and with the base unit situated in a support structure for use while standing.

FIG. 2 discloses the base unit (600) of this invention. This base unit (600), could be sold alone and many of the attachments noted above later purchased for use therewith. It is to be understood that the base unit (600) would include a top surface (102') detachably attached to lips or edges. A hot sealer frame (200') is attached detachably to mounts (610'), and the electrical components necessary for operation of the hot sealer frame (200') are housed modularly or in hard wire fashion in compartment (112). As such, the base unit (600) may be placed on a floor or table top and used. However, many people may wish the device to have its own stand and to connect to a manual or automatic plastic feeder unit. FIGS. 3 and 5 address these desires.

In FIG. 3, a stand (1000) is shown. It is largely rectangular in shape having extending from its bottom two legs (1002). Stand (1000) has a front surface (1004), two opposing side surfaces (1006), a back surface (1008), and a recessed top surface (1010) largely surrounded by an upstanding edge (1012). That edge (1012), however, is cut away on one side in front surface (1004). The cut away section is denoted as (1014). The width of top surface (1010) is generally equal to that of base unit (600) and mounts (610) so that base unit (600) may sit on top surface (1010) and the front face (106') of base unit (600) will lie generally in line with front surface (1004). The length of base unit (600) corresponds with the length of the edge (1012) on the front surface (1004). This leaves the area defined by cut away section (1014) free.

In use, and as seen in FIG. 5, base unit (600) is placed on top of stand (1000) as above described. If the user then desires a manual or automatic plastic feed unit (1102) with a plastic feed roller (1100'), the unit is in a self contained unit (1102). This unit (1102), may be placed next to base unit (600) by sliding it into cut away section (1014). Plastic feed unit (1102) will be designed to have the dimensions to enable its fitted placement next to base unit (600) on stand (1000). Alternatively, plastic feed unit (1102) and base unit (600) may be simply set adjacent to one another on any surface and detachably clipped together by known means. If plastic feed unit (1102) is automatic, then in its body, all of its needed electrical components will be housed. A wire will extend from the body for detachable connection to an outside power source or through an opening in compartment (112). If the device includes a timer, this timer may be housed in plastic feed unit (1102) or by plugging in plastic feed unit (1102) into compartment (112) there may be a central timer or connection through switch (116') for powering and shutting off plastic feed unit (1102) so that roller (1100') dispenses plastic at a set time. The manner of handling these electrical connections is not significant to this invention. What is significant is the modularity of each unit. Plastic feed unit (1102) is constructed such that it can operate independently of base unit (600) or in conjunction therewith.

Figure 6A:
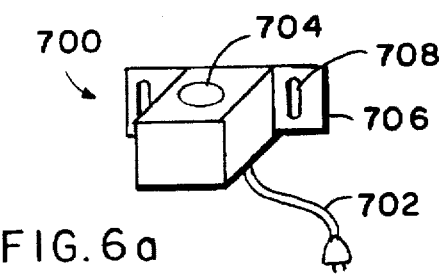
FIG. 6a is a front perspective view of a modular electro-magnetic means for use with a sealing arm of the invention.
Figure 6B:
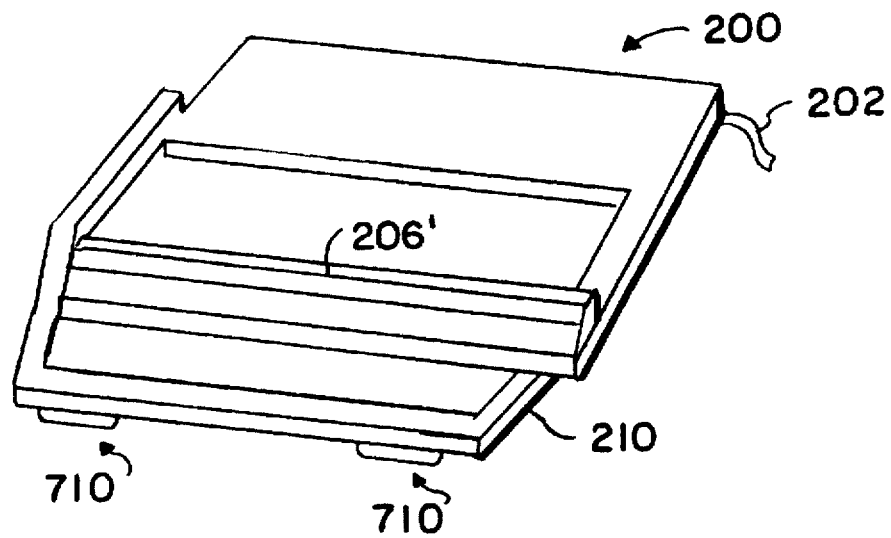

FIGS. 6a and 6b detail the electro-magnetic device (700) of the invention. Again, the exact means of making this device is not the subject of this invention. What is the subject of this invention is that this device, as with the other devices, are autonomous units which can be used independently of or dependently with the base unit (600). In FIG. 6a, there is a box for holding the electrical components of electro-magnetic device (700) This will include a timer, a rectifier bridge, transformer, fuse holder etc. The electro-magnetic device (700) is capable of independent operation but is plugged into E2 to obtain its power through the operation of switch (116').

On the top surface of the electro-magnetic device (700), extends a magnet (704) which functions magnetically when the electro-magnetic device (700) is powered. At the back surface of the electro-magnetic device (700), extend attachment wings (706) with elongated openings (708). Openings (708) are so shaped so that electro-magnetic device (700) may be adjustably mounted on front face (106') of base unit (600) through means of bolt hole openings bt discussed above. A bolt is passed through opening (708) and bt in front surface (106'), and when the device is in the proper position, nuts and washers, if necessary, are affixed to the bolts to hold the device in place.

In FIG. 6b, an attachment (210) is shown affixed permanently or removably to hot sealing frame (200') below handle (206'). Extending from the base of attachment (210) are attraction plates (710). These plates are dimensioned and created to respond to the magnetic force offered by magnet (704). Since two attraction plates (710) are shown, likely two electro-magnetic devices (700) have been mounted to the front face (106') of base unit (600). Each device has a magnet (704) which interacts with attraction plate (710) to hold arm (200') against pads (300') for a set period of time. Of course, instead, one electro-magnetic device (700) with several magnets (704') or one long magnet (704') could be used. Again, the point of invention here is not the exact configuration of the device, but that it is a modular independent unit which along with attachment (210) or a different sealing arm (200') with attachment (210) there attached, may be purchased and added to a base unit (600) as a separate independent means. Prior art devices are permanently attached, and hard wired into the machine. All rectifiers, timers and the like are held in the base machine. There is no separate, fully contained, electro-magnetic device which can be removed from the base machine.

Figure 7:
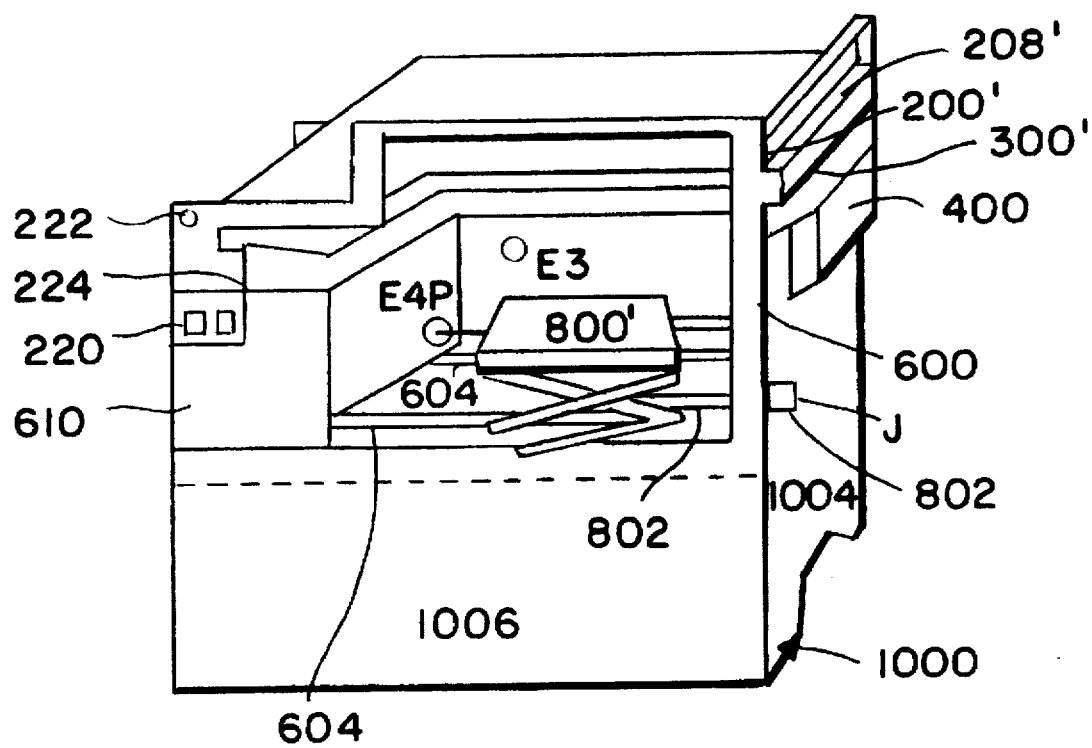
FIG. 7 is an end view of the FIG. 5 embodiment.

FIG. 7 depicts the positioning of scissor jack (800') in base unit (600) and the detachable and adjustable connection of sealing arm (200') to mounts (610). Turning to the scissor jack (800'), FIG. 7 is an open end (606) view of base unit (600) mounted in stand (1000). It is an end view of FIG. 5. Resting on top of support bars (604) is scissor jack (800'), the feet of which may be detachably bolted to support bars (604) by providing holes in support bars (604) and holes in the feet of scissor jack (800'). Opening E4P in back face (110') has extending therethrough, the pneumatic tube and wire associated with pneumatic means (400) including the piston on back face (110'). Scissor jack (800') is situated so as not to interfere with this passage of tubes and wires from E4P to E5P. The adjustment mechanism for scissor jack (800'), whether mechanical or electrical, extends out of opening J so that the jack (800') may be raised or lowered in height with respect to top surface (102'). If scissor jack (800') is automated, its full electrical means, including motor etc. is connected to the scissor jack (800'). Only a wire would extend from the scissor jack (800') for connection to an outside power source or for connection to compartment (112). In prior art devices, whether the scissor jack (800) is manual or automatic, it is permanently affixed to the machine (100). One cannot simply remove the scissor jack (800). In the present invention, removable and separate use is readily possible, by unbolting the feet of scissor jack (800') from support bars (604), removing the control from opening J, and if automated, unplugging scissor jack (800') from compartment (112).

Figure 8:
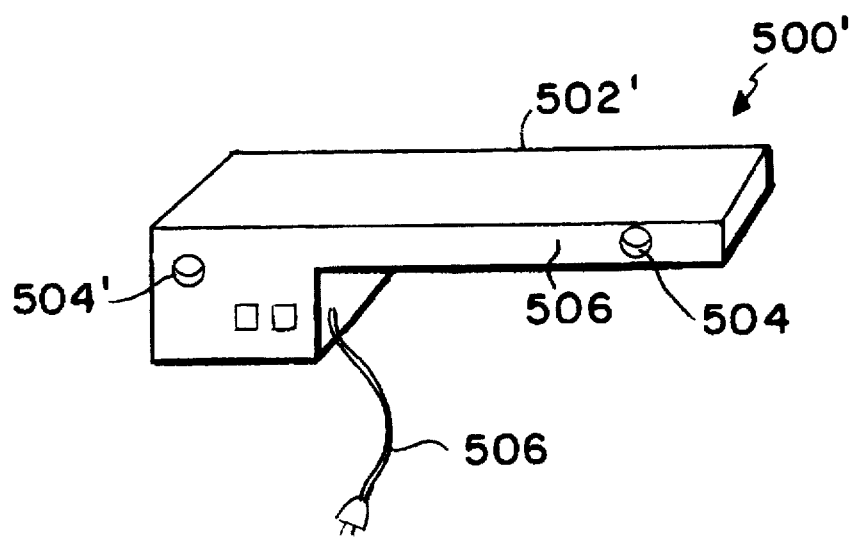
FIG. 8 is a conveyor means which is ready for detachable mounting to the base machine of the invention.

In use, scissor jack (800) may be brought up to the level of top surface (102') and used as work surface (104'). Alternatively, a conveyor (500') may be placed on the top surface of the scissor jack (800'). By adjustment of the scissor jack (800'), the conveyor (500') surface comprised of an endless belt (502), can be brought up to the level of top surface (102') so that it becomes work surface (104'). A conveyor (500') for use with the present invention is shown in FIG. 8. Again, this device, conveyor (500'), is self contained, having its own motor, speed control, timer, and electrical means held on its body so that it may be simply plugged into any outlet and operate or plugged into compartment (112) through opening E3 and operate. In FIG. 8, conveyor (500'), is shown in some detail. It includes an endless belt (500') which rolls around idle and drive rollers (501). Cord (506) extends from it for electrical connection to a power source. Conveyor (500') can be detachably connected to the surface of scissor jack (800') by means such as bolts and nuts, or other means. Again the conveyor (500') and scissor jack (800'), would each define holes for connection to each other. Generally, by connection through E3, the conveyor will be connected also to momentary switch (116') to work therewith. In this way, when the momentary switch (116') is in position to power wires (202') and (208') in frame (200'), the conveyor (500') will not operate because of the positioning of momentary switch (116'). This occurs when frame (200') has been brought against pads (300) and momentary switch (116') is depressed by the weight of frame (200'). When frame (200') is brought away from pads (300) and momentary switch (116') is released, then conveyor (500') will be powered through connection E3 so that the endless belt (502) will turn to move the items on the endless belt (502) toward open end (606).

Figure 9:
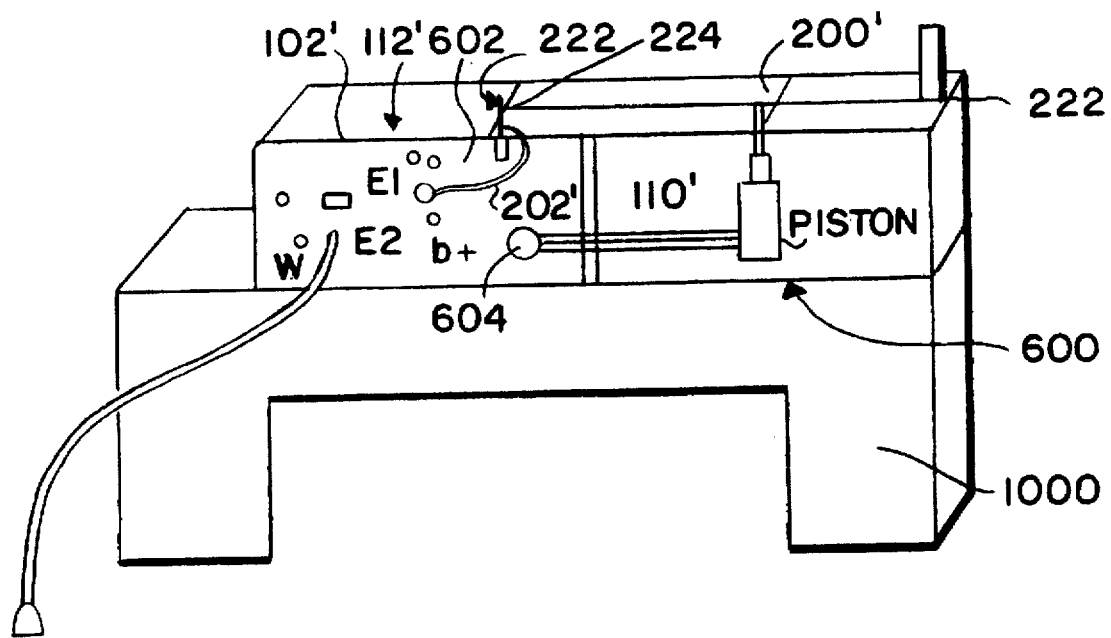
FIG. 9 is a back view of the FIG. 5 view with the plastic feeder removed.

Reviewing FIG. 7 in conjunction with FIG. 9, the detachable and adjustable connection of hot sealing frame (200') is discussed. FIG. 9 provides a rear view of FIG. 5 with the plastic sealing device (1102) absent. Hot sealing frame (200'), is seen in these figures to attach at its rear end to mounts (610) by means of a pivotal and adjustable connection through support foot (224). The pivotal connection is seen at point (222) where a pivot pin joins hot sealing frame (200'). Defined in the bottom portion of support foot (224) are elongated openings (220). A bolt may be passed through these openings and openings defined in mounts (610) to detachably connect hot sealing frame (200') to base unit (600). The adjustable attachment is desirable for two reasons. The attachment is simple in nature so that the frame (200') may be readily attached and detached by removing the bolts and disconnecting wire (202') as discussed above. Further, the elongated openings (220) which enable adjustable position attachment, enable a firm connection between the hot sealing frame (200') in the area of wires (208') and pads (300'). This is important since each set of pads (300') differ in height. So the distance of the frame (200') from top surface (102') must be adjusted to ensure that a good contact is made between frame (200') and pads (300'). This is necessary so that the desired result is achieved with the plastic that is laminated and/or cut by being pressed and heated between hot sealing frame (200') and pads (300'). Since pads (300') must be replaced over the life of a machine because they burn, and since pads (300') are not consistent in thickness from pad to pad, the ability to readily adjust frame (200') with respect to top surface (102') is significant.

With the better understanding of the connection of the hot sealing frame (200') to base unit (600'), one can see that if one wishes to remove the hot sealing frame (200') and replace it with another hot sealing frame (200'), perhaps one configured to work with odd shaped items or one with options as disclosed in the inventor's U.S. Pat. No. 5,177, 931, incorporated herein by reference, or even one permanently fitted with attraction plates (710) as in FIG. 6b, the user may readily do so by unbolting support foot (224) and unplugging wire (202'). Pads (300') may also be removed and replaced with differently configured pads (300') if necessary; and due to the adjustable attachment, the user will be assured that there will be a good contact between the replaced pads (300') and the replaced hot sealing frame (200').

Reviewing FIG. 9, the piston associated with pneumatic means (400') is seen removably connected to frame (200'). If no pneumatic means (400') is used, this connection would not appear. Instead, hinges or spring means (not shown) will detachably attach between the rear of frame (200') and lip or edge (608) of back face (110'). The spring would bias the frame away from work surface (104'), pads (300') and top surface (102'). The spring may again be mounted on plates which can be readily bolted to lip or edge (608) of back face (110') and to hot sealing frame (200') at its rear side in the area where hinges (203) are shown in the prior art device of FIG. 1 or instead centrally of lip or edge (608) of back face (110').

Finally, an automatic operating device can be added by replacing the modular electrical components held in compartment (112). Alternatively, one could merely, add the unit to the hard wired components and changing, if necessary the hot sealing frame (200'). This device would cause the machine to operate in a fully automatic mode accomodating all parts attached thereto.

In use, and by the selected electrical wiring of the momentary switch (116') of the invention to connect to various of the modular units herein, simply by plugging these units into compartment (112), the present device may be combined in various different ways. A few nonlimiting examples are as follows.

A base unit (600) and top surface (102') with pads (300') are equipped with a conveyor (500'), frame (200'), pneumatic means (400') and momentary switch (116'). It will be recalled that the piston is connected by means of a tube and wiring to the pneumatic means (400') which by means of its own connections brings in power and air. A reed switch is attached to the piston, and the plunger of the piston is attached to the rear of frame (200'). The piston includes a magnet such that when the plunger moves downwardly so does the magnet. The reed switch responds to the magnet and triggers the release of high pressure through the air tube into the piston. This high pressure situation will push up the plunger of the piston and thereby bring the frame (200') down against pads (300'). The actual operation of the system is as follows. The pneumatic means (400'), whether plugged into compartment (112) or into a regular outlet, is not connected to the momentary switch (116'). It instead, has its own timer mechanism. Palm Buttons (PB) on the top of the pneumatic means (400'), as seen in FIG. 5, and known in the art, are pushed to activate the pneumatic means (400'). This starts the timer of the pneumatic means (400'). Air then begins to flow at low pressure into the piston to lower hot sealing frame (200') toward pads (300'). This eventually causes the magnet in the piston to pass near the reed switch attached to the piston, which causes the reed switch to move to a closed position. In this position, the air pressure in the pneumatic means (400') increases pushing the hot sealing frame (200') against pads (300') with increased pressure. The timer in the pneumatic means will then turn off, the air pressure will be dropped to a low level again and the sealing frame (200') will be lifted upwardly away from pads (300').

Concurrent, with the foregoing activity, the momentary switch (116') is depressed and released. The conveyor (500'), which is connected through opening E3 into compartment (112), is connected also to the momentary switch (116') through the E3 connection. When the frame (200') is being held against pads (300'), momentary switch (116') allows current through wire (202') and (208') but does not allow power to pass to conveyor (500') through opening E3. When the hot sealing frame (200') is allowed to come up, momentary switch (116') is released, power to wires (202', 208') is stopped and conveyor (500) is activated by power through connection E3 so that items on the endless belt (502), which has acted as work surface (104'), are moved. A timer or sensor may stop the conveyor before the pneumatic means (400') again causes the frame (200') to move downwardly, or the simple movement of the frame (200') downwardly due to the pneumatic cycle will cause the conveyor (500') to stop operation because of the pressure on the momentary switch (116'). One can readily see that the if the plastic feed unit (1102) is connected into the momentary switch (116') and is automatic, it too can be caused to feed in new plastic sheets each time the frame (200') is lifted.

In a similar vein, a base unit (600) could be equipped with magnetic means (700') above, instead of the pneumatic means (400'). This means that through its connection into opening E2, it would be connected to momentary switch (116'). When frame (200') is brought against pads (300'), depression of momentary switch (116') allows power to pass into the magnetic means (700') from compartment (112) thereby activating the magnetic means to magnetize magnet (704). Magnet (704) then attracts attraction plate (710) on frame (200') to hold frame (200') against pads (300'). A timer in magnetic means (700') will eventually stop the power from compartment (112), frame (200') will be lifted by the bias of the spring, the momentary switch (116') will be released and the conveyor (500') activated as above.

Other combinations of modular units and their interrelationships will be apparent to those skilled in the art given the foregoing teachings. While attachment means such as holes and bolts have been often discussed herein, these may be replaced by any attachment means which enable the easy attachment and detachment of parts.

In conclusion, a truly modular unit is available to the user. This unit may include any one of or a combination of the modular self standing units discussed above as well as other units. Thus and by way of example but not limitation, a base manual unit may be first purchased. Later, it may be added to by a manual plastic feeder. The two can then be augmented by a stand. As time progresses, these units may be enhanced by a conveyor and/or pneumatic means, sealing arms of various configurations, electro-magnetic means, an automatic arm control, and an automatic plastic feeder. With the teachings of the present description, one can understand that the present invention may be upgraded or downgraded as desired, with little lost cost to the owner of the machine and with great ease. The inventor has invented a user-friendly, modular device with components that work independently of or in conjunction with each other. The invention provides the user with a personally designed machine which may be upgraded or down graded as desired and which is susceptible to continuous modular modification such that it can reflect the current technology of the time. The modules may be separately used for services without the base unit. By way of example, the conveyor could be plugged into a wall plug and used for other purposes. Similarly, the scissor jack could be so used as could any of the other units with the exception of the hot sealing frame. However, if desired, that unit too could be made completely modular such that it could merely plug into compartment (112) or a wall plug for operation.

The present invention is claimed as follows:

1. A modular sealing system for sealing plastic wrap around an item, the system comprising:
   a base unit;
   electrical components in the base unit for controlling and powering the system:
   a first electrically powered modular hot sealing frame for sealing a first layer of plastic wrap and a second layer of plastic together, the first hot sealing frame including a first elongated heated portion extending in a first direction and a second elongated heated portion extending in a second direction different from the first direction wherein the first and second elongated heated portions contact only the first layer of plastic wrap so that the first layer of plastic wrap melts to the second layer of plastic wrap, the hot sealing frame being detachably mountable to the base unit and detachably electrically connectable to the electrical components, wherein the first electrically powered modular hot sealing frame is interchangeable with a second electrically powered modular hot sealing frame including two elongated heated portions each extending in a direction different from the other for sealing plastic wrap together, the second electrically powered modular hot sealing frame being detachably mountable to the base unit and detachably electrically connectable to the electrical components, the second electrically powered modular hot sealing frame having a different configuration or functioning in a different manner from the first electrically powered modular hot sealing frame.

2. A system as claimed in claim 1, wherein the first modular hot sealing frame and the electrical components complete an electrical circuit and an electrical current from the electrical components is carried through a portion of the first modular hot sealing frame.

3. A system as claimed in claim 1, wherein the base unit is detachably connectable to and operable with a separably operable, electrically powered modular unit, the modular unit being detachably electrically connectable to the base unit, the modular unit Upgrading or downgrading the system without requiring a portion of the system to be removed or replaced.

4. A system as claimed in claim 2, wherein the base unit is detachably connectable to and operable with a separably operable, electrically powered modular unit, the modular unit being detachably electrically connectable to the base unit, the modular unit upgrading or downgrading the system without requiring a portion of the system to be removed or replaced.

5. A system as claimed in claim 1, wherein the base unit is detachably connectable to and operable with one or more of the following additional modular units that upgrade the system: an automatic plastic feeder; a manual plastic feeder; a pneumatic cylinder device to automatically raise and lower the hot sealing frame; a magnetic device to lock the hot sealing frame in place for a selected time; a conveyor device; and a scissor jack for raising or lowering the item being sealed in the plastic wrap.

6. A system as claimed in claim 2, wherein the base unit is detachably connectable to and operable with one or more of the following additional modular units that upgrade the system: an automatic plastic feeder; a manual plastic feeder; a pneumatic cylinder device to automatically raise and lower the hot sealing frame; a magnetic device to lock the hot sealing frame in place for a selected time; a conveyor device; and a scissor jack for raising or lowering the item being sealed in the plastic wrap.

7. A system as claimed in claim 1, the system further comprising a modular unit detachably mountable to the base unit, the modular unit being selected from the group consisting of a manual modular unit and an automatic, electrically powered modular unit, the automatic modular unit being detachably electrically connectable to the electrical components, the manual modular unit and the automatic modular unit being interchangeable with each other.

8. A system as claimed in claim 2, the system further comprising a modular unit detachably mountable to the base unit, the modular unit being selected from the group consisting of a manual modular unit and an automatic, electrically powered modular unit, the automatic modular unit being detachably electrically connectable to the electrical components, the manual modular unit and the automatic modular unit being interchangeable with each other.

9. A system as claimed in claim 7, wherein the modular unit is a plastic feeder for feeding the plastic wrap.

10. A system as claimed in claim 8, wherein the modular unit is a plastic feeder for feeding the plastic wrap.

11. A system as claimed in claim 7, wherein the modular unit is a scissor jack for raising or lowering the item being sealed in the plastic wrap.

12. A system as claimed in claim 8, wherein the modular unit is a scissor jack for raising or lowering the item being sealed in the plastic wrap.

13. A system as claimed in claim 1, wherein the system is a modular L-sealing system.

14. A system as claimed in claim 2, wherein the system is a modular L-sealing system.

15. A system as claimed in claim 5, wherein the system is a modular L-sealing system.

16. A system as claimed in claim 5, wherein the modular units are separably operable.

17. A system as claimed in claim 1, wherein the system further comprising a conveyor detachably connectable to the system, the conveyor being operable with the system when attached thereto or operable independently of the system when disconnected therefrom.

18. A system as claimed in claim 1, wherein the system further comprising a pneumatic cylinder device to automatically raise and lower hot sealing frame, the pneumatic cylinder device being detachably connectable to the system, the pneumatic cylinder device being operable with the system when attached thereto or operable independently of the system when disconnected therefrom.

19. A system as claimed in claim 1, the system further comprising a magnetic device to lock the hot sealing frame in place for a selected time, the magnetic device being detachably connectable to the system, the magnetic device being operable with the system when attached thereto or operable independently of the system when disconnected therefrom.

20. A system as claimed in claim 1, the system further comprising an automatic feed mechanism detachably connectable to the system for automatically operating the hot sealing frame.

21. A system as claimed in claim 1, wherein the electrical components are a separate unit detachably placeable within the base unit to power modular units connectable to the system and to coordinate the operation of the modular units.

22. A system as claimed in claim 2, wherein the electrical components are a separate unit detachably placeable within the base unit to power modular units attachable to the system and to coordinate the operation of the modular units.

23. A system as claimed in claim 3, wherein the electrical components are a separate unit detachably placeable within the base unit to power modular units attachable to the system and to coordinate the operation of the modular units.

24. A system as claimed in claim 5, wherein the electrical components are a separate unit detachably placeable within the base unit to power modular units attachable to the system and to coordinate the operation of the modular units.

* * * * *